United States Patent [19]
MacDuff

[11] 3,908,479
[45] Sept. 30, 1975

[54] VARIABLE RATIO RACK AND PINION POWER STEERING GEAR

[76] Inventor: Stanley I. MacDuff, P.O. Box 1525, Daytona Beach, Fla. 32015

[22] Filed: Dec. 10, 1973

[21] Appl. No.: 423,106

[52] U.S. Cl............. 74/498; 74/388 PS; 91/375 H
[51] Int. Cl.²... B62D 1/20; F16H 35/00; F15B 9/10
[58] Field of Search............... 74/422, 498, 388 PS; 91/375 H

[56] References Cited
UNITED STATES PATENTS

| | | | |
|---|---|---|---|
| 2,973,658 | 3/1961 | Bishop | 74/498 X |
| 3,064,491 | 11/1962 | Bishop | 74/498 X |

*Primary Examiner*—Leonard H. Gerin
*Attorney, Agent, or Firm*—B. P. Fishburne, Jr.

[57] ABSTRACT

A rack and pinion power steering gear for small sports type cars having a conventional rack and pinion with a ratio changing gear floating between them. The ratio changing gear is a conventional circular gear having an eccentrically positioned pin carried in bearings which are arranged to slide in slots centered on and aligned with a perpendicular to the rack passing through the center of the pinion. The ratio changing gear is proportioned to make one revolution for approximately full stroke of the rack. The pinion is proportioned to give the number of steering wheel turns desired from lock-to-lock. The eccentricity of the shaft predetermines the effective ratios at the center and at the locks. A modified form of the invention employs a swinging yoke to position the ratio changing gear on an arc which approximates the aforesaid perpendicular.

12 Claims, 8 Drawing Figures

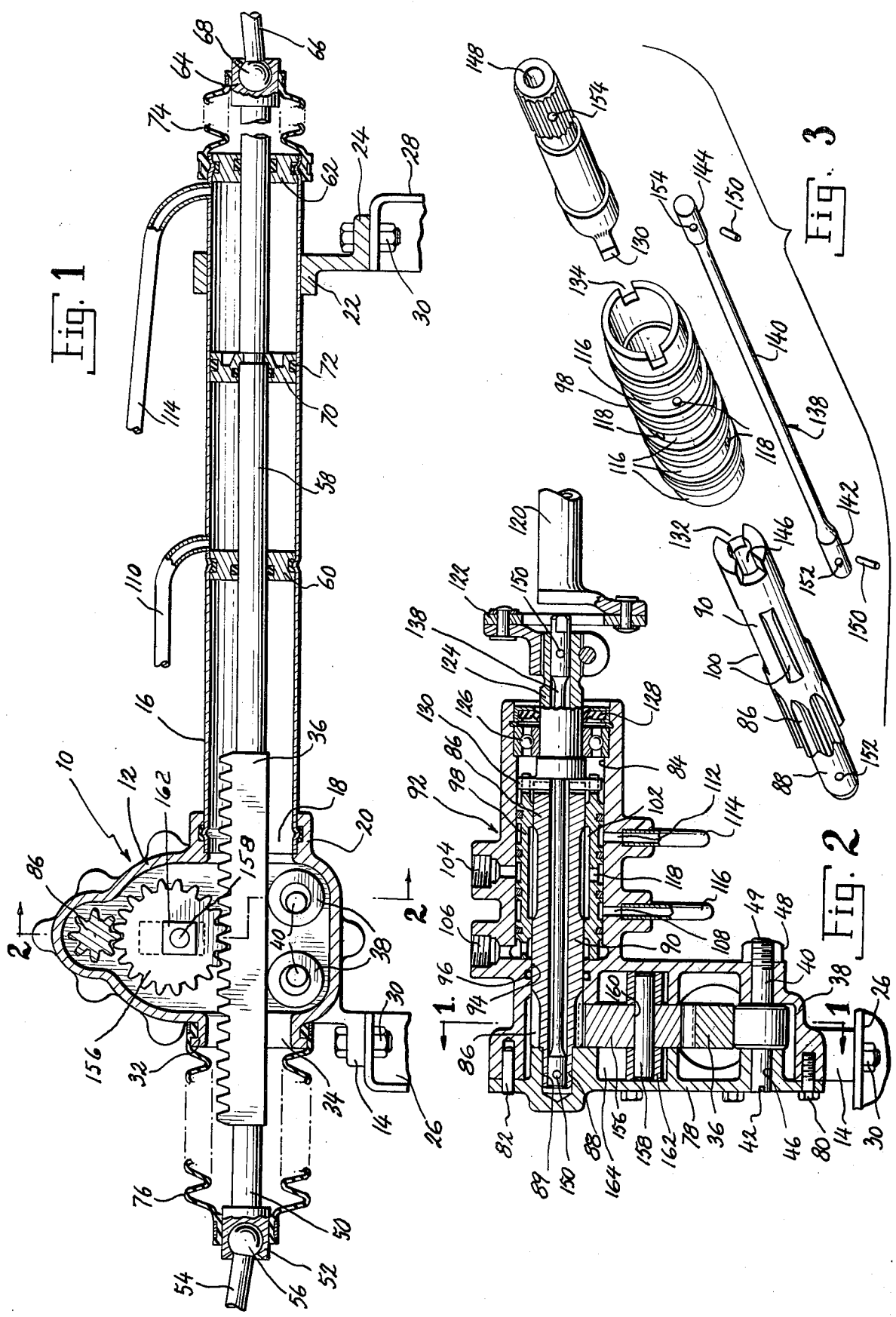

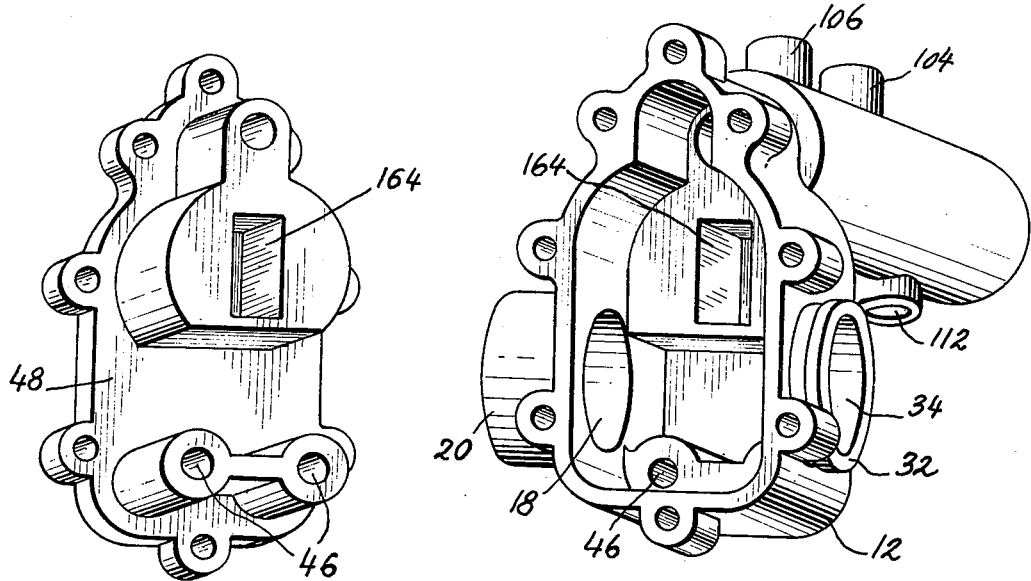
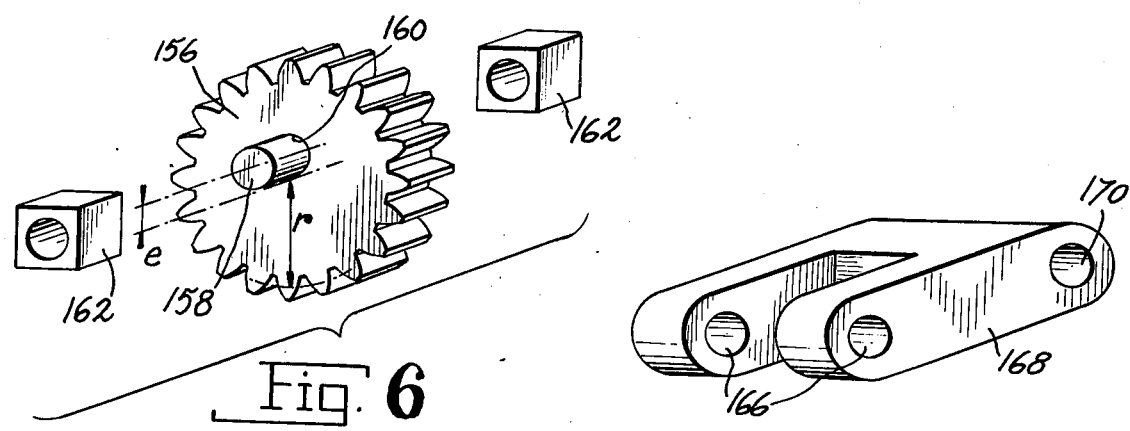
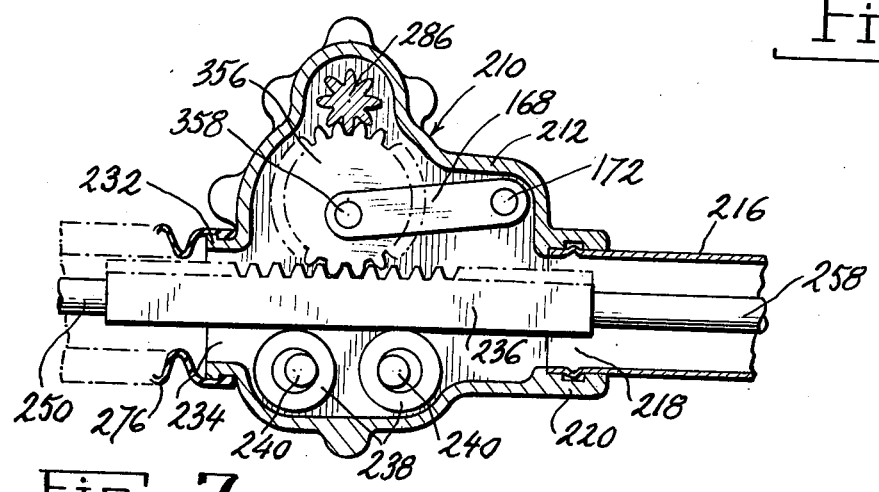

VARIABLE RATIO RACK AND PINION POWER STEERING GEAR

BACKGROUND OF THE INVENTION

Many attempts have been made to incorporate the principle of ratio variation into the popular rack and pinion type steering gears for small cars, but certain limitations have prevented them from being accepted. One method which has been tried is to provide a pinion with variable pitch radius and a rack with varying height teeth to match. Such a gear is limited to about 1.8 turns of the steering wheel to steer the vehicle from lock-to-lock. This has been rejected as undesirably fast steering. An attempt to remedy this has been made by introducing a pair of reduction gears ahead of the deformed pinion. The added cost has made this compromise undesirable. In addition, the amount of ratio change available has been somewhat limited by problems of design and manufacture of the deformed gears.

It is an object of this invention to provide a variable ratio gear which permits the vehicle designer to select any number of turns of the steering wheel to steer from lock-to-lock as he wishes. A desirable number is about 2.4 turns.

Another object of this invention is to provide a variable ratio steering gear using conventional gears made on ordinary machines with standard tools, whereby the cost increase to provide the variable ratio feature is held to a minimum.

Still another object of the invention is to provide a variable ratio steering gear in which the designer, having selected the effective average ratio by determining the number of steering wheel turns for steering from lock-to-lock, also is free to select from a wide range the effective peak ratio at the center and the effective minimum ratio at the locks.

It is proposed to accomplish these objects by providing a steering gear having a conventional straight rack and a conventional circular pinion selected in suitable proportions to provide the desired average ratio giving the desired number of turns of the steering wheel to steer from lock-to-lock. The rack is arranged to move in a straight line and the pinion is arranged to rotate on a fixed center spaced from the rack. A ratio changing gear is provided which has approximately the same number of teeth as the rack. The ratio changing gear is a conventional circular gear and it is positioned between the rack and pinion in mesh with each. As an important feature of the invention, the ratio changing gear is provided with an eccentric pin which rotates in bearing blocks constrained to slide in slots formed in the walls of the steering gear housing. The slots are aligned with and centered on a perpendicular erected from the pitch line of the rack and passing through the center line of the pinion. Variation of the eccentricity of the pin in relation to the pitch circle of the ratio changing gear will vary the effective peak ratio at the center and the corresponding effective minimum ratio at the locks through a wide range of values.

In a modified form, the ratio changing gear may be held in position by a yoke swinging on a pin secured in the steering gear housing. In this modification, the eccentric pin moves in an arc whose chord corresponds to the perpendicular erected to the pitch line of the rack through the center line of the pinion.

As a minor feature of the invention, the rack may be supported by eccentric rollers which may be adjusted to provide a mesh preload of the gears at the center position. Because the true center of the ratio changing gear moves to one side or the other as the vehicle is steered toward the locks, this mesh preload will be relieved, making the gear free of friction and enabling it to respond readily to the self-returning or self-centering tendency of the vehicle suspension. This is considered to be a very desirable quality in steering gears for compact and sports type vehicles, and sometimes is obtained only at substantial cost by introducing special reliefs and modifications of gear tooth form.

The steering gear is provided with a conventional power cylinder connected to the rack. The steering gear also has the usual input shaft which may be connected to the steering wheel by the usual flexible joint. A rotary valve, having simulated reaction by means of a torsion bar, is interposed between the input shaft and the pinion. As a feature of the invention, the rotor of the valve is formed integral with the pinion gear and is provided with the usual longitudinal slots. A valve sleeve surrounds the rotor and is formed on its inner surface with cooperating longitudinal slots forming, with the slots of the rotor, selective passages to and from the power steering pump and reservoir to the alternate ends of the power cylinder. Annular grooves, separated by floating seals, on the outer surface of the valve sleeve provide fluid communication from ports located in the steering gear housing to the rotary valve. The ends of both the valve rotor and the valve sleeve are each formed with a cross slot in substantial alignment with each other. The slot in the valve sleeve closely fits a spline or feather formed on the end of the input shaft to provide a valve operating connection, and the slot in the valve rotor loosely fits the same spline to provide a manual steering connection, if the power should fail. The torsion bar extends through aligned central bores in the valve rotor-pinion element and the input shaft and has one of its ends pinned to each.

BRIEF DESCRIPTION OF THE DRAWINGS

FIG. 1 is a longitudinal section of the steering gear taken transversely of the vehicle on the line 1—1 of FIG. 2.

FIG. 2 is a transverse section of the steering gear taken on the line 2—2 of FIG. 1.

FIG. 3 is an exploded axonometric projection view of the three principal parts of the rotary valve of the steering gear.

FIG. 4 is an axonometric view of the cover of the housing of the steering gear of FIG. 1.

FIG. 5 is an axonometric view of the housing of the steering gear of FIG. 1.

FIG. 6 is an exploded view in axonometric projection of the ratio changing gear with its eccentric pin and sliding bearing blocks.

FIG. 7 is a partial longitudinal sectional view similar to FIG. 1 of a modified form of the invention.

FIG. 8 is a view in axonometric projection of the yoke for positioning the ratio changing gear of the modified form of the invention shown in FIG. 7.

DETAILED DESCRIPTION

Referring to FIGS. 1-6 inclusive of the drawings, there is shown a hydraulic power steering gear 10 having a cast housing 12 formed with a mounting foot 14. A steel tube 16, forming the power cylinder, is secured in an opening 18 in a boss 20 of the housing 12 and extends transversely of a vehicle (not shown). A cast bracket 22, provided with another mounting foot 24, is clamped about the tube 16 near its end. The two mounting feet 14 and 24 are secured to steel vehicle frame members 26 and 28, respectively, by means of bolts 30. The wall of the housing 12 opposite the boss 18 is formed with a similar boss 32 surrounding an opening 34 in alignment with the tube 16. A gear toothed rack 36 is positioned through the openings 18 and 34 and supported for sliding movement therein by a pair of rollers 38. The rollers 38 are rotatably supported by eccentric pins 40 having screw driver slots 42 in one of their ends and having threads 44 formed on their other ends. The pins 44 are secured in suitable holes 46 in the housing by nuts 48. The rollers 38 may be mounted on suitable anti-friction bearings which are not shown as they do not constitute a feature of the invention.

The left end of the rack 36, as seen in FIG. 1, is secured by suitable means to a rod extension 50 terminating in a ball socket 52. A steering link 54, having a ball 56 secured in the socket 52, extends to the usual steering arm, not shown, of the left front wheel of the vehicle. In the present example, the steering gear 10 is positioned forward of the axis of the vehicle front wheel and the steering arm extends forward of the conventional king pin in order for the correct steering action to take place i.e., for the vehicle to turn right when the steering wheel is rotated in a clockwise direction. The right end of the rack 36 is secured by suitable means to a piston rod 58 which extends through a pair of cylinder heads 60 and 62 secured in the cylinder tube 16, and projects beyond the tube 16 to terminate in another ball socket 64. A steering link 66, having a ball 68 secured in the socket 64, extends to the usual steering arm, not shown, of the right front wheel of the vehicle. A piston 70 is secured to the piston rod 58 intermediate the cylinder heads 60 and 62 and the piston is provided with an appropriate sealing ring 72 engaging the inner walls of the cylinder tube 16. A tubular bellows type elastomeric boot 74 is clamped to the right end of the cylinder tube 16 and to the ball socket 64 to protect the projecting end of the piston rod 58 from dirt and moisture. A similar boot 76 is clamped to the boss 32 and to the ball socket 52 and serves not only to exclude dirt and moisture, but also to retain lubricant within the gear cavity of the housing 12.

For convenience in manufacture and assembly, the housing 12 is made in two parts, the second part constituting a cover 78 secured to the forward face of the housing 12 by means of several capscrews 80 and at least two dowel pins 82. The housing 12 and the cover 78 are formed with a stepped bore 84 which is spaced a substantial distance from the rack 36 and whose center line is positioned on a perpendicular erected from the center of the rack pitch line when the rack is in the centered position as shown in the drawings. A pinion gear 86 has a reduced diameter pilot bearing portion 88 which is journaled in a reduced diameter portion 89 of the stepped bore 84 formed in the housing cover 78. The other end of the pinion gear 86 forms a valve rotor 90 of a hydraulic steering valve 92. The pinion gear-valve rotor 86-90 also is journaled in the housing 12 at 94. A seal 96 for separating the hydraulic fluid in the valve 92 from lubricant in the gear cavity of the housing 12 is also located in the bearing area 94.

To the right of the bearing 94 the valve rotor 90 has a valve sleeve 98 closely fitted to it. The rotor 90 is formed with longitudinal slots 100 on its outer surface, and the sleeve 98 is formed with longitudinal slots 102 on its inner surface. The slots 100 and 102 cooperate to form selective fluid passages through the valve 92 in the well-known manner. The housing 12 has formed on it four bosses having ports intersecting the valve bore 84 as follows: pump inlet port 104, pump reservoir port 106, cylinder port 108 connected by a conduit 110 to the left end of the hydraulic cylinder, and cylinder port 112 connected by a conduit 114 to the right end of the hydraulic cylinder. Annular grooves 116 on the outer surface of the valve sleeve 98 communicate these ports with the interior passages of the valve 92 by means of radial holes such as 118.

The vehicle steering wheel (not shown) is mounted on a steering column 120, connected by a flexible joint 122 to an input shaft 124. The input shaft 124 is rotatably mounted in the end of the bore 84 by means of a ball bearing 126 and is sealed against hydraulic fluid loss by a seal 128. The inner end of the shaft 124 is formed with a crosswise spline or key 130, and the adjacent ends of the valve rotor 90 and the valve sleeve 98 are formed with slots 132 and 134, respectively. The slot 134 closely fits the spline 130 so that the sleeve 98 is driven directly by the input shaft. The slot 132 fits the spline 130 loosely to provide freedom for valve movement and an alternate manual connection in the event of failure of the hydraulic system. A torsion bar 138 has a reduced diameter central portion 140 and enlarged end portions 142 and 144. The torsion bar is positioned in aligned central bores 146 and 148 of the pinion gear-valve rotor 86-90 and the input shaft 124, respectively. The enlarged ends 142 and 144 of the torsion bar 138 closely fit the bores 146 and 148 and are secured in the extreme ends of the bores by pins 150 pressed into suitable cross-drilled holes 152 and 154, respectively, see FIG. 3.

A ratio changing gear 156 is positioned between the rack 36 and the pinion gear 86 in mesh with each. The ratio changing gear 156 is provided with a pin or shaft 158 pressed into a hole 160 bored eccentrically to the pitch line of the teeth of the gear 156, FIG. 6. Generally square bearing blocks 162 are journaled on the projecting ends of the pin 158 on each side of the gear. The blocks 162 are arranged to slide in slots 164 formed in the housing 12 and the housing cover 78. The slots 164 are aligned with and generally centered on the perpendicular erected from the pitch line of the rack 36 and passing through the center of the pinion gear 86. The ratio changing gear 156 is a conventional circular gear generated about a true center displaced from the center of the eccentric pin 158. Desirably, the ratio changing gear 156 has about the same number of teeth as the rack 36 so as to make about one revolution when the rack makes its full stroke. In the illustration, the rack 36 has 21 teeth and the ratio changing gear 156 has 20 teeth. The pinion gear 86 is shown with 8 teeth giving two and one-half turns lock-to-lock if a full revolution of the ratio changing gear is used. Note that when the rack 36 is in its centered position, the ratio changing gear 156 has its pin 158 at the point closest to the rack 36, and the axis of eccentricity of the gear i.e., a line extending through the center of the eccentric pin 158 and the true center of the gear 156 coincides with the aforesaid line erected perpendicular to the pitch line of the rack 36 and passing through the center of the pinion gear 86. If the actual eccentricity of the pin 158 is $e$, the true pitch radius of the ratio changing gear 156 is $r$, and the average ratio of the gear is $R_a$, the effective ratio at the center will be $$R_c = R_a (r+e)/(r-e)$$

(Eq. 1)

and the effective ratio at the locks will be $$R_L = R_a (r-e)/(r+e).$$

(Eq. 2)

Thus it is easily seen that the ratio variation provided by this steering gear can be varied easily over a wide range of values by varying the value of $e$. The ratio curve will approximate the shape of a sine wave.

Referring now to FIGS. 7 and 8 of the drawings showing a modified form of the invention, like parts will be referred to by the same numerals increased by 200. This form of the invention differs only in the means by which the ratio changing gear 356 is constrained so that the eccentric pin 358 moves in a path approximating the line erected perpendicular to the pitch line of the rack 236 through the center of the pinion gear 286. The eccentric pin 358 is journaled in aligned bearings 166 formed in the bifurcated end of a yoke or link 168. The yoke 168 has a pin hole or bearing 170 at its opposite end. The yoke 168 is swingably supported on a pin 172 which passes through the bearing 170 and has its outer ends supported and secured by suitable means in aligned holes formed in the walls of the steering gear housing 212 and housing cover 278. Again, the eccentric axis of the ratio changing gear 356 is made coincident with the aforesaid perpendicular when the steering gear 210 is in its centered position. Ideally, the pin 172 is located at the same distance from the rack pitch line as the true center of the ratio changing gear 356. As a result of this, when the ratio changing gear rotates, the eccentric pin 358 moves in an arc whose chord is substantially coincident with the said perpendicular. By making the distance between the bearings 166 and the pin hole 170 great relative to the eccentricity $e$ of the pin 358, the curvature of this arc becomes quite small and the difference between it and a straight line becomes functionally negligible.

OPERATION

When the driver turns the steering wheel in a clockwise direction, for example, the steering column 120, the flexible joint 122, the input shaft 124 and the valve sleeve 89 are all rotated clockwise simultaneously. Because there is resistance to movement of the vehicle wheels, the pinion gear 86 and its valve rotor portion 96 do not turn immediately although torque is applied to them through the angular deflection of the torsion bar 138. As a result of the relative movement of the valve sleeve 98 and the valve rotor 96, a path is created in the valve 92 directing fluid from the pump port 104 to the cylinder port 108 and thence through the tube 110 to the left hand end of the power cylinder 16. The fluid exerts a force on the piston 72 which, combined with the torque of the torsion bar 138, overcomes the resistance of the wheels and the piston rod 58, the rack 36, the rod extensions 50, the ball sockets 52 and 64, and the links 54 and 66 all move rightward, turning the vehicle wheels in the well-known manner to steer the vehicle to the right. As the rack 36 moves, the ratio changing gear 156 turns counter-clockwise and the pinion gear 86 turns clockwise following up the steering gear motion. Fluid displaced from the chamber between the piston 70 and the cylinder head 62 passes through the tube 114 to the cylinder port 112 and through an appropriate passage formed between the valve rotor 90 and the valve sleeve 98 to the pump reservoir port 106. The operation of rotary power steering valves of this kind is well known in the art and consequently it is not thought necessary to describe in detail the exact configuration and arrangement of slots, ports and passages.

Rotation of the steering wheel in a counter-clockwise direction produces a displacement of the valve rotor 90 and the valve sleeve 98 which creates a path directing fluid from the pump inlet port 104 to the cylinder port 112 and thence through the tube 114 to the right hand end of the power cylinder. The pressure of the fluid moves the piston 70 and associated parts leftward, turning the vehicle wheels in the well known manner to steer the vehicle to the left. As the rack 36 moves to the left, the ratio changing gear 156 turns clockwise and the pinion gear 86 turns counter-clockwise following up the steering gear motion.

In either case, i.e., of steering to the right or steering to the left, as the steering gear components are moved from the illustrated center position, it will be noted that the ratio changing gear 156 presents a long lever arm, equal to $r$ plus $e$, in contact with the pinion gear 86 and a short lever arm, equal to $r$ minus $e$, in contact with the rack 36. When the ratio changing gear 156 has been rotated about 90° or one-quarter of a revolution, the corresponding lever arms are approximately equal to $r$ and are equal to each other. When the ratio changing gear 156 has been rotated 180° or one-half a revolution and is approaching the steering gear lock, the lever arms are reversed and the shorter arm, equal to $r$ minus $e$, is engaged with the pinion gear 86 and the longer arm, equal to $r$ plus $e$, is engaged with the rack 36. It is obvious that this creates an increased leverage or, in other words, a higher gear ratio in the center position, and that the leverage or gear ratio changes progressively as movement continues away from the center position, reaching a minimum at the locks.

As these changes are taking place, the pin 158, constrained by the square bearing blocks 162 and the slots 164 which are closely fitted to the bearing blocks 162, moves away from its initial position nearer to the rack 36 to a final position in which it is nearer the pinion gear 86. Since the slots 164 are aligned with and centered on a line normal to the pitch line of the rack 36 and passing through the center of the pinion gear 86, it will be understood that the behavior of the steering gear 10 is identical regardless of which direction the steering wheel is rotated and that the ratio curve will be symmetrical and will resemble a sine wave. The ratio curve can be defined as a plot of instantaneous rate of change of steering wheel angular position per degree of steered wheel angular position as the ordinate, plotted against an abscissa which may be either steering wheel or steered wheel angular position.

The modified form of the invention of FIGS. 7 and 8 operates in a similar manner with the exception that the path of motion of the eccentric pin 358 is not a perfectly straight line normal to the pitch line of the rack 236 and passing through the center of the pinion gear 286. Instead it is an arc of a circle whose radius is equal to the distance between the pin holes 166 and 170 in the link 168. As previously described, this arc can be positioned so that its chord coincides with the line normal to the pitch line of the rack and passing through the center of the pinion gear 286. If the length of the link is made suitably long, the deviation of the arc from the chord, i.e., the actual path from the ideal path, is very small, whereby it may be said that the actual path approximates the ideal path, viz. a line normal to the pitch line of the rack 236 passing through the center of the pinion gear 286. The effect of this deviation is to cause the ratio curve from center to left lock to differ slightly from the ratio curve from center to right lock. In actual practice, this difference would be undetectable and of no importance.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim -

1. A vehicle steering gear comprising:
   a housing having walls;
   a pinion gear rotatable in said housing;
   a rack spaced from the pinion gear and slidable in said housing; and
   a ratio changing gear positioned between the rack and the pinion gear, said ratio changing gear having an eccentric pin, and
   means in engagement with said housing to constrain said eccentric pin to move in a path approximating a line perpendicular to the pitch line of said rack and passing through the center of said pinion gear.

2. The invention of claim 1 in which said means comprises slots in the walls of said housing.

3. The invention of claim 1 in which said means comprises slots in the walls of said housing and bearing blocks journaled on said eccentric pin and slidable in said slots.

4. The invention of claim 3 in which the steering gear includes a power cylinder having a piston and a piston rod attached to said rack,
   an input shaft, and
   valve means for controlling flow of hydraulic fluid to said power cylinder interposed between said input shaft and said pinion gear.

5. The invention of claim 1 in which said means comprises a yoke having said eccentric pin journaled in one end and having the other end of the yoke swingably attached to said housing.

6. The invention of claim 5 in which said yoke constrains said eccentric pin to move in an arc having said perpendicular line forming a chord thereof.

7. The invention of claim 6 in which the steering gear includes a power cylinder having a piston and a piston rod attached to said rack,
   an input shaft, and
   valve means for controlling flow of hydraulic fluid to said power cylinder interposed between said input shaft and said pinion gear.

8. The invention of claim 1 in which the steering gear includes a power cylinder having a piston and a piston rod attached to said rack,
   an input shaft, and
   valve means for controlling flow of hydraulic fluid to said power cylinder interposed between said input shaft and said pinion gear.

9. The invention of claim 8 in which said valve means comprises:
   the said housing being formed with a valve bore intersected by pump ports and cylinder ports;
   a rotor formed integrally with said pinion gear and having longitudinal slots;
   a sleeve in sealing engagement with said valve bore surrounding the rotor, said sleeve being formed with cooperating longitudinal slots forming selective fluid paths with the slots of said rotor, and having annular grooves on its outer surface communicating fluid to said pump ports and cylinder ports;
   said sleeve and rotor having adjacent ends formed with aligned slots;
   the said input shaft having a spline formed across its end in operative engagement with the slots of the sleeve and rotor;
   a bearing seated in said valve bore and supporting said input shaft; and
   a torsion bar interconnecting said valve rotor and said input shaft.

10. A steering gear comprising a housing, a rack positioned in the housing, a pinion positioned in the housing and spaced from said rack, and ratio varying means positioned between and in engagement with said rack and pinion.

11. The invention of claim 10 in which said ratio varying means is a gear having an eccentric rotational axis, and means to constrain said eccentric axis to move in a path approximating a line perpendicular to the pitch line of said rack and intersecting the center of said pinion.

12. The invention of claim 11 in which said means includes an element having linear sliding engagement with said housing.

* * * * *